No. 655,361. Patented Aug. 7, 1900.
A. W. CASH.
DIAPHRAGM FOR PRESSURE REGULATING VALVES.
(Application filed Oct. 5, 1899.)
(No Model.)
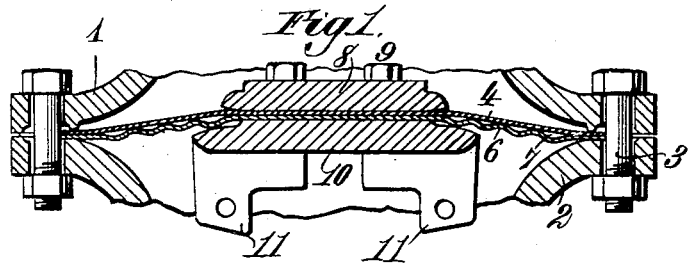
Fig. 1.
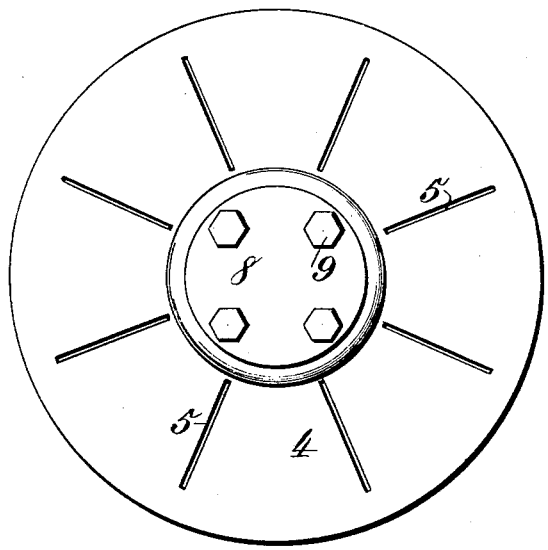
Fig. 2.
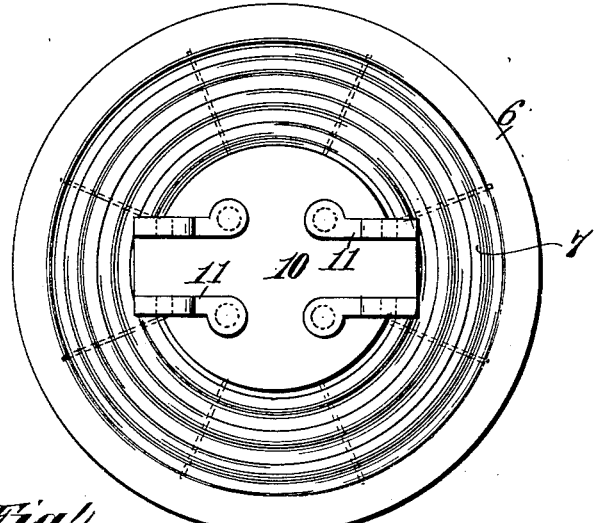
Fig. 3.
Fig. 4.
Witnesses,
Robert Everitt
F. C. Keefer
Inventor,
Arthur W. Cash,
By James L. Norris.
Att'y.
THE NORRIS PETERS CO., PHOTO-LITHO., WASHINGTON, D. C.

UNITED STATES PATENT OFFICE.

ARTHUR W. CASH, OF NEWARK, NEW JERSEY, ASSIGNOR TO THE FOSTER ENGINEERING COMPANY, OF SAME PLACE.

DIAPHRAGM FOR PRESSURE-REGULATING VALVES.

SPECIFICATION forming part of Letters Patent No. 655,361, dated August 7, 1900.

Application filed October 5, 1899. Serial No. 732,663. (No model.)

*To all whom it may concern:*

Be it known that I, ARTHUR W. CASH, a citizen of the United States, residing at Newark, in the county of Essex and State of New Jersey, have invented new and useful Improvements in Diaphragms for Pressure-Regulating Valves, of which the following is a specification.

This invention relates to an improved diaphragm for pressure-regulating valves and other service—such as gages, recorders, &c.—and has for its object to provide a diaphragm of durable construction and having a proper degree of flexibility to permit of the required movements.

In that class of pressure reducing and regulating valves where the valve proper is attached to and its movement controlled by a diaphragm which in turn receives its movement by reason of the fluid-pressure acting on its inner side, tending to close the valve, and springs or weighted levers acting against its outer side, tending to open the valve, the diaphragm must be of sufficient dimensions to readily overcome the weight and friction of the moving valve and yet be sufficiently flexible and pliable to permit of the full opening or movement of the valve without undue change in the reduced or regulated pressure. The common and well-known practice in this connection has been to use diaphragms constructed of some thin tough metal and provided with annular corrugations which give the desired flexibility and permit of the required movement, but lacking the very essential property of being able to withstand comparatively-high pressures without excessive stretching or bulging. Heretofore to avoid serious weakness a diaphragm made of a circular sheet of thin tough metal without corrugations and only slightly bulged or dish-shaped has been used. A diaphragm of this construction gives the desired strength to stand the high pressure, but soon becomes buckled or cracked, due to the continued excessive movement required to operate the valve.

To overcome the various objections to which the diaphragms for pressure-reducing valves and like devices are subject, I have devised a diaphragm comprising a plate or sheet of some thin tough metal without corrugations and bulged or dish-shaped sufficiently to allow of the required movement and provided with radial slots, which do not, however, materially detract from its strength and yet permit of the continued and prolonged movement of the diaphragm without cracking or breaking. This slotted plate in itself cannot be complete or sufficient, as the radial slots would permit escape of the fluid-pressure. To overcome this difficulty, I provide an inner imperforate diaphragm-plate made, preferably, of some very thin, tough, and non-corrosive metal, such as phosphor-bronze. This inner diaphragm-plate is provided with annular corrugations which freely permit of its continued and prolonged movement without buckling or cracking, and being without any slots or other openings it forms a seal through which the fluid-pressure cannot pass. Thus the inner thin corrugated metal diaphragm-plate forms a seal capable of withstanding the action of water, steam, air, gas, &c., without any liability to deterioration of said inner plate, while the outer non-corrugated diaphragm-plate composed of thicker stronger metal, preferably steel, and provided with the radial slots will give the required flexibility and the necessary strength to hold and sustain the inner diaphragm-plate and the pressure acting against it.

My invention therefore consists of a diaphragm for pressure-regulating devices composed of an inner sheet or plate of thin metal having annular corrugations and an outer sheet or plate of metal not corrugated, but slightly bulged or dish-shaped and provided with radial slots, whereby the inner diaphragm-plate forms the seal and the outer diaphragm-plate gives the strength to resist the fluid-pressure acting against the inner plate, as hereinafter described and claimed.

In the annexed drawings, illustrating my invention, Figure 1 is a sectional side elevation of my improved diaphragm, showing the lower or inner corrugated plate and an upper or outer non-corrugated plate, together with the rims or flanges of the valve-casing between which the two diaphragm-plates are clamped and held in position, also showing a central upper or outer plate against which the springs or levers act and a portion of the inner part to which the valve proper is to be mechanically connected. Fig. 2 is a plan or top view of the upper or outer non-corrugated diaphragm-plate provided with radial slots. Fig. 3 is an under plan of the bottom or inner corrugated diaphragm-plate. Fig. 4 is a diagrammatic representation of the upper diaphragm-plate, in which the full lines represent about the central section of the non-corrugated plate when held at its full upward or outward movement by the fluid-pressure, the dotted lines representing about the central section when the diaphragm is in a central position and the valve one-half open, the fluid-pressure causing it to assume a curved position.

Referring to Fig. 1, the numerals 1 and 2 designate the flanged rim portions of the upper and lower parts of a valve-casing between which the diaphragm is securely clamped, as by means of bolts 3 at the edges of the diaphragm, as shown. The reference-numeral 4, Figs. 1, 2, and 4, designates the upper diaphragm-plate, which is preferably made of steel, though it may be constructed from some other thin tough metal. This upper diaphragm-plate 4 is bulged or dished, as shown, to a sufficient extent to allow for the required movement, and, as shown in Fig. 2, it is provided with a number of radial slots 5, which are extended from the centrally-clamped portion of the diaphragm to points near its periphery, and thereby add to the flexibility and pliability of this plate without materially impairing its strength. Beneath the upper diaphragm-plate 4 and in close proximity therewith is placed the lower diaphragm-plate 6, which is preferably made of a thin tough metal, such as phosphor-bronze. This lower or inner diaphragm-plate 6 is provided with a suitable number of annular corrugations 7, Figs. 1 and 3, which impart the required flexibility and permit continued and prolonged movement or vibration of this plate without liability to buckling or cracking. This lower diaphragm-plate 6 being wholly imperforate forms a continuous seal through which the fluid-pressure cannot pass, and the construction of this plate is such that it is capable of withstanding the action of fluids and gases without injury or deterioration.

To the upper diaphragm-plate 4 there is secured a central upper plate or disk 8 to afford a bearing for the usual springs or weighted levers that act against the outer side of the diaphragm in a direction tending to open the valve. The disk 8 may be secured in place by means of bolts and nuts 9, which also secure to the under side of the inner corrugated diaphragm 6 an inner disk or plate 10, that may have lugs or ears 11 thereon for connection of the diaphragm with the valve proper.

By reference to Fig. 1 it will be observed that the rims 1 and 2 and the disks 8 and 10 hold the two diaphragm-plates 4 and 6 in close juxtaposition, thereby forming a single diaphragm for action of fluid-pressure against the under side of the inner plate and for the action of springs or levers against the disk 8, carried on the upper or outer diaphragm-plate.

By making the upper non-corrugated and radially-slotted diaphragm-plate 4 from steel and constructing the lower corrugated plate 6 from phosphor-bronze and by arranging and connecting these plates in the manner described a most excellent result is obtained and at less cost than by using several corrugated or dished diaphragms, as heretofore.

The radially-slotted upper diaphragm-plate provides strength to withstand the pressure, and yet it is sufficiently flexible to permit a maximum movement without buckling or cracking, while the inner corrugated diaphragm-plate being imperforate forms a seal to prevent the escape of fluid-pressure and is also sufficiently flexible to follow the outer slotted diaphragm-plate, against which it lies. A single corrugated diaphragm does not usually have sufficient strength in itself to withstand high pressures; but by combining such a plate with an upper radially-slotted plate of tough yet flexible and durable material there is produced a diaphragm that is well suited to the requirements of pressure-reducing valves and other devices for controlling fluid-pressure. A diaphragm of this construction is durable, extremely sensitive to variation of pressure, and is not liable to buckling or cracking or other injury in service.

In Reissue Patent No. 11,621 to John M. Foster, July 20, 1897, there is shown and claimed a flexible diaphragm composed of a number of non-corrugated plates, the upper ones having perforations to prevent high pressure from buckling or bulging the diaphragm in case of possible leakage of air past the lower diaphragm-plate. I am also aware that it has been proposed to strengthen either a corrugated or non-corrugated diaphragm-plate by means of radially-arranged segmental plates superposed on the lower diaphragm-plate; but my invention differs from all others of which I am aware in combining with an inner or lower corrugated and imperforate diaphragm-plate an outer or upper flexible plate provided with radial slots, such slotted plate not only giving the diaphragm additional strength to resist any tendency to buckling, bulging, or cracking, but, furthermore, imparting the greatest possible flexibility to permit a maximum movement of the diaphragm with a perfectly-free action and without any liability to injurious strain.

My improved diaphragm composed of an imperforate and corrugated thin metal plate and a non-corrugated radially-slotted plate secured together in contact with each other will permit of excessive and continual vibration without buckling or premature rupture. It is usual for plain diaphragm-plates to buckle or crack in radial directions. Hence the advantage of providing such plates in a compound diaphragm with a plurality of radial slots that will counteract a tendency to buckling, bulging, or cracking. In the Foster diaphragm above referred to the non-radial perforations do not add to the life or lasting quality of the diaphragm as affected by excessive or continued vibration or movement and do not lessen the tendency of the diaphragm to buckle and finally crack or break, such perforations being designed to accomplish the sole purpose of relieving any fluid-pressure that might otherwise accumulate between the plates composing the diaphragm by reason of a leak around the central stem or through any slight crack in the plate next to the fluid-pressure. While a corrugated diaphragm-plate has a flexibility similar to my radially-slotted diaphragm-plate, it does not possess the strength of the latter. By combining these plates in a single diaphragm—namely, an inner flexible and imperforate plate of thin corrugated metal to be directly acted on by the fluid-pressure and an outer non-corrugated flexible plate provided with radial slots to brace the corrugated and imperforate inner plate, said plates being secured together in close juxtaposition—I obtain at comparatively-small expense a diaphragm that possesses the required flexibility with strength to withstand excessive or continued vibration, thereby practically obviating any tendency of the diaphragm to buckle and finally crack or break.

What I claim as my invention is—

1. The herein-described diaphragm for pressure-regulating devices, composed of an inner flexible sheet or plate of thin metal corrugated, and an outer flexible sheet or plate of metal non-corrugated but slightly bulged or dish-shaped and provided with a number of radial slots extended from a centrally-clamped portion of the diaphragm to points near its periphery, said plates being secured together in close juxtaposition, whereby the inner corrugated diaphragm-plate forms the seal and the outer radially-slotted diaphragm-plate gives the strength and flexibility to resist the fluid-pressure acting against the inner plate and prevent buckling or cracking, substantially as specified.

2. The herein-described diaphragm for pressure-regulating devices, composed of an inner flexible sheet or plate of thin metal provided with annular corrugations, and an outer flexible sheet or plate of metal having a plurality of radial slots extended from a centrally-clamped portion of the diaphragm to points near its periphery, said plates being secured together in close juxtaposition, whereby the inner corrugated diaphragm-plate forms the seal and the outer radially-slotted diaphragm-plate imparts the required flexibility and strength to resist fluid-pressure acting against the inner plate and prevent buckling, cracking and strain, substantially as specified.

In testimony whereof I have hereunto set my hand in presence of two subscribing witnesses.

ARTHUR W. CASH.

Witnesses:
JOHN W. MILLER,
FREDERICK J. GREENBERG.